United States Patent
VanBlon et al.

(10) Patent No.: US 9,807,730 B2
(45) Date of Patent: Oct. 31, 2017

(54) MODIFYING A DEVICE NOTIFICATION

(71) Applicant: LENOVO (Singapore) PTE, LTD., New Tech Park (SG)

(72) Inventors: Russell Speight VanBlon, Raliegh, NC (US); John Carl Mese, Cary, NC (US); Nathan J. Peterson, Durham, NC (US); Rod D. Waltermann, Rougemont, NC (US); Arnold S. Weksler, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 355 days.

(21) Appl. No.: 14/032,983

(22) Filed: Sep. 20, 2013

(65) Prior Publication Data

US 2015/0087274 A1 Mar. 26, 2015

(51) Int. Cl.
| | | |
|---|---|---|
| *H04M 11/10* | (2006.01) | |
| *H04M 3/42* | (2006.01) | |
| *H04W 68/02* | (2009.01) | |
| *H04M 19/04* | (2006.01) | |

(52) U.S. Cl.
CPC ........... *H04W 68/02* (2013.01); *H04M 19/04* (2013.01)

(58) Field of Classification Search
CPC ...... G05B 15/02; H04W 4/027; H04W 4/028; H04W 4/046; H04W 4/16; H04M 2242/30; H04M 2242/14
USPC ................................................. 455/413, 414
See application file for complete search history.

(56) References Cited

U.S. PATENT DOCUMENTS

| | | | | |
|---|---|---|---|---|
| 8,700,102 | B2* | 4/2014 | Ferren ................ | G02B 13/0065 379/88.13 |
| 2005/0018834 | A1 | 1/2005 | Furnas | |
| 2005/0195952 | A1 | 9/2005 | Dyer et al. | |
| 2012/0021806 | A1* | 1/2012 | Maltz ...................... | H04W 4/20 345/8 |
| 2012/0051590 | A1 | 3/2012 | Hsu | |
| 2012/0220338 | A1* | 8/2012 | Degrazia ........... | H04M 1/72519 455/556.1 |
| 2012/0270578 | A1* | 10/2012 | Feghali .................. | H04W 4/14 455/466 |
| 2013/0084923 | A1* | 4/2013 | Schuman ................ | H04W 4/00 455/567 |

FOREIGN PATENT DOCUMENTS

| | | |
|---|---|---|
| CN | 101764884 A | 6/2010 |
| CN | 201601841 U | 10/2010 |
| CN | 102118513 A | 7/2011 |
| CN | 102833416 A | 12/2012 |
| CN | 103024181 A | 4/2013 |
| CN | 103167127 A | 6/2013 |
| EP | 2157771 A1 | 2/2010 |
| GB | 2313978 A | 12/1997 |
| WO | 2009/074210 A2 | 6/2009 |

* cited by examiner

*Primary Examiner* — Joshua Schwartz
(74) *Attorney, Agent, or Firm* — Kunzler Law Group

(57) ABSTRACT

For modifying a device notification, an indication module detects a user awareness indication of a device notification for a device. A notification module modifies the device notification in response to detecting the user awareness indication and concurrently maintains a notification response option.

14 Claims, 9 Drawing Sheets

MODIFYING A DEVICE NOTIFICATION

FIELD

The subject matter disclosed herein relates to device notifications and more particularly relates to modifying device notifications.

BACKGROUND

Description of the Related Art

Electronic devices such as mobile telephones employ device notifications to alert a user to an event that may require response. For example, a mobile telephone may ring and/or vibrate to indicate an incoming telephone call. Unfortunately, device notifications can be annoying to others, particularly when the device notifications persist.

BRIEF SUMMARY

An apparatus for modifying a device notification is disclosed. The apparatus includes a processor and a memory storing computer readable code executable by the processor. The computer readable code includes an indication module and a notification module. The indication module detects a user awareness indication of a device notification for a device. The notification module modifies the device notification in response to detecting the user awareness indication and concurrently maintains a notification response option. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
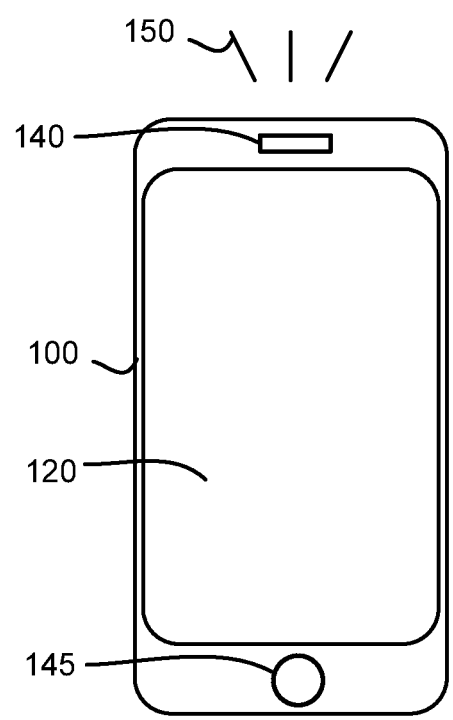
FIG. 1 is a drawing illustrating one embodiment of an electronic device.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing computer readable code. The storage devices may be tangible, non-transitory, and/or non-transmission.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in computer readable code and/or software for execution by various types of processors. An identified module of computer readable code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices, and may exist, at least partially, merely as electronic signals on a system or network. Where a module or portions of a module are implemented in software, the software portions are stored on one or more computer readable storage devices.

Any combination of one or more computer readable medium may be utilized. The computer readable medium may be a computer readable signal medium or a computer readable storage medium. The computer readable storage medium may be a storage device storing the computer readable code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable code embodied therein, for example, in baseband or as part of a carrier wave. Such a propagated signal may take any of a variety of forms, including, but not limited to, electro-magnetic, optical, or any suitable combination thereof. A computer readable signal medium may be any storage device that is not a computer readable storage medium and that can communicate, propagate, or transport a program for use by or in connection with an instruction execution system, apparatus, or device. Computer readable code embodied on a storage device may be transmitted using any appropriate medium, including but not limited to wireless, wire line, optical fiber cable, Radio Frequency (RF), etc., or any suitable combination of the foregoing.

Computer readable code for carrying out operations for embodiments may be written in any combination of one or more programming languages, including an object oriented programming language such as Java, Smalltalk, C++ or the like and conventional procedural programming languages, such as the "C" programming language or similar programming languages. The computer readable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by computer readable code. These computer readable code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The computer readable code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable code.

Descriptions of Figures may refer to elements described in previous Figures, like numbers referring to like elements.

FIG. 1 is a drawing illustrating one embodiment of an electronic device 100. The device 100 is depicted as a mobile telephone. However, the device 100 may also be a computer workstation, a tablet computer, a laptop computer, an eye glass computer, a wearable computer, or the like. The device 100 includes a touch screen 120, a speaker 140, and a microphone 145. The device 100 may issue a device notification 150. The device notification 150 may alert a user to an event that may need a response, such as an incoming call, an email, a text message, a notification, an alarm, and the like. In the depicted embodiment, the device notification 150 is an audible notification. The audible notification may be emitted from the speaker 140. However, the device notification 150 may also be a visual notification, a vibrational notification, a tactile notification, a thermal notification, or the like.

Device notifications 150 may be designed to be attention grabbing. Alternatively, device notifications 115 may only be subtly noticeable. However, an effective device notification 150 is noticed by the user of the device 100, and often by others in proximity to the user.

To ensure that the user notices the device notification 150, many device notifications persist until either the user performs a needed action such as accepting a telephone call, or until the device notification 150 times out. However, if the device notification 150 were to end as soon as the user was cognizant of the device notification 150, the user and others in proximity to the user could be spared the continued annoyance of the device notification 150.

The embodiments described herein detect a user awareness indication of the device notification 150 for the device 100. In addition, the embodiments modify the device notification in response to detecting the user awareness indication as will be described hereafter. Thus as soon as the user indicates awareness of the device indication 150, the device notification may be silenced, reduced, changed, or made otherwise less intrusive.

Figure 2:
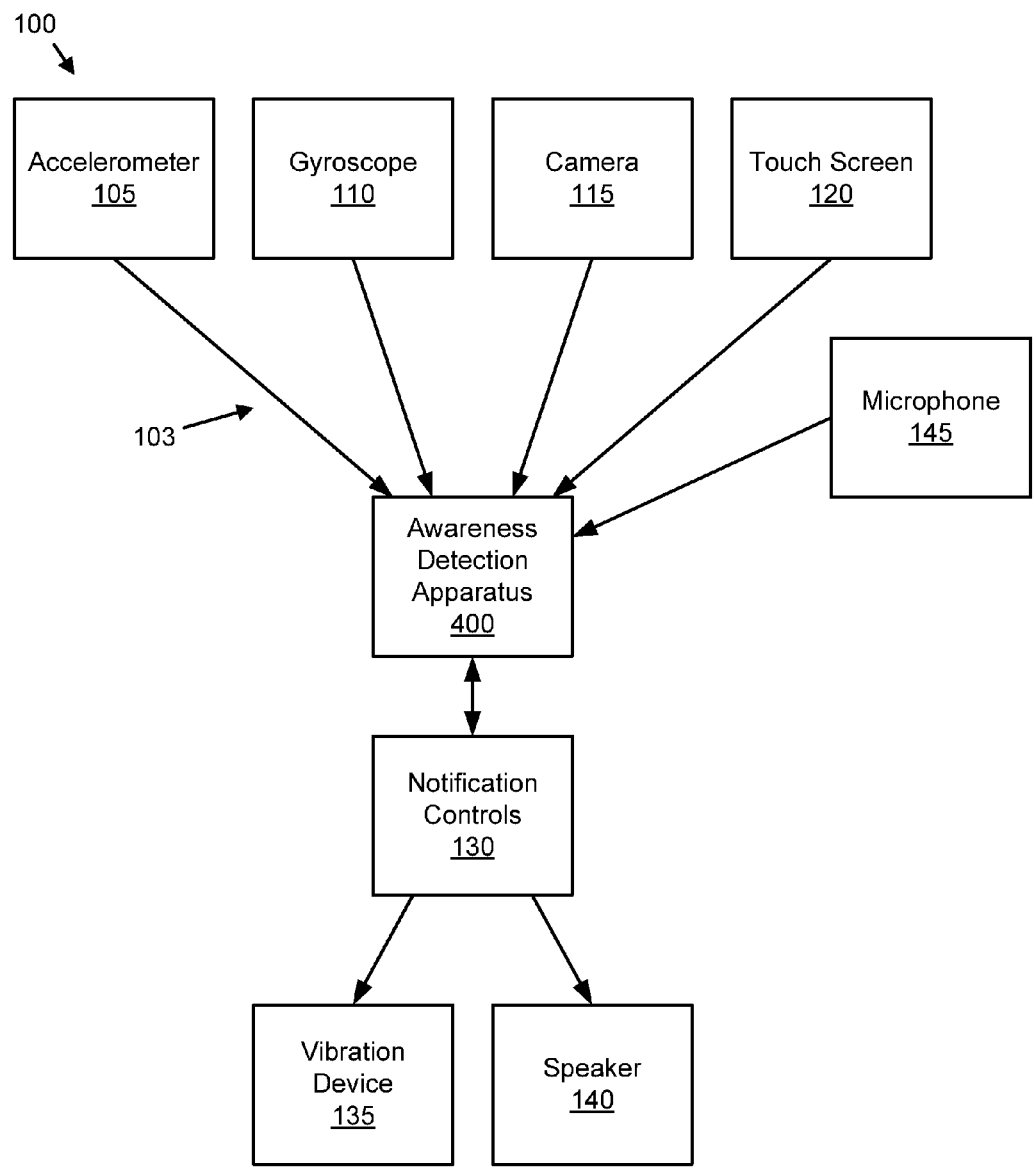
FIG. 2 is a schematic block diagram illustrating one embodiment of an electronic device.

FIG. 2 is a schematic block diagram illustrating one embodiment of the electronic device 100. For simplicity, only selected elements of the device 100 are shown. The device 100 includes an accelerometer 105, a gyroscope 110, the camera 115, the touch screen 120, the microphone 145, an awareness detection apparatus 400, notification controls 130, a vibration device 135, and the speaker 140.

The notification controls 130 may initiate the device notification 150. In one embodiment, the notification controls 130 cause the speaker 140 to emit an audible device notification 150. Alternatively, the notification controls 130 may cause the vibration device 135 to vibrate the electronic device 100. In alternate embodiments, the notification controls 130 may initiate a visual device notification 150, a tactile device notification 150, a thermal device notification 150, or the like.

The awareness detection apparatus 400 may detect a user awareness indication of the device notification 150. The apparatus 400 may detect the user awareness indication by monitoring sensor outputs 103 that include but are not limited to outputs from the accelerometer 105, the gyroscope 110, the camera 115, the touch screen 120, the microphone 145, or combinations thereof.

In response to detecting the user awareness indication, the apparatus 400 may modify the device notification 150. For example, the apparatus 400 may silence an audible device notification 150. Alternatively, the apparatus 400 may reduce a volume of the audible device notification 150. In addition, the apparatus 400 may terminate or reduce one or more of a visual device notification 150, a tactile device notification 150, a thermal device notification 150, or the like.

While modifying the device notification 150, the apparatus 400 may also concurrently maintain a notification response option. The notification response option may allow the user to respond to the device notification 150. The notification response option may be an option to accept an incoming telephone call, to open a dialog box for an incoming text message, to open a window for an incoming email, to turn off and alarm, to view a full notification, or the like. Thus although the device notification 150 is modified to be less intrusive, the device 100 maintains the notification response option.

Figure 3:
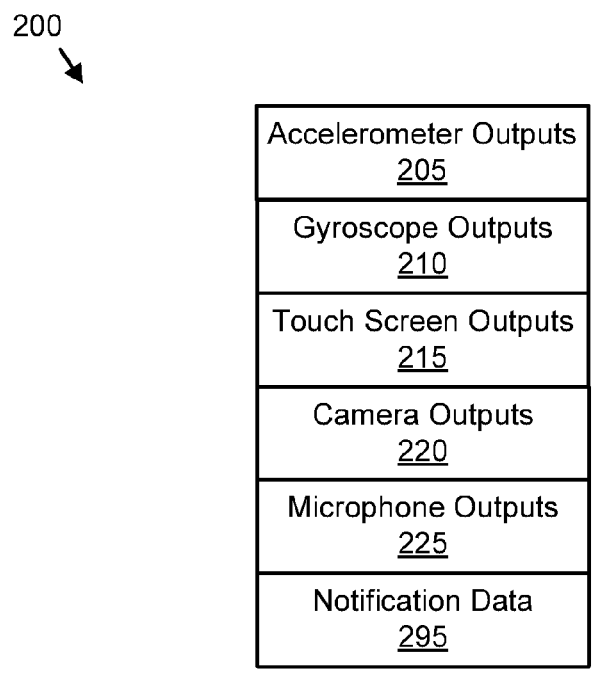
FIG. 3 is a schematic block diagram illustrating one embodiment of notification data.

FIG. 3 is a schematic block diagram illustrating one embodiment of notification data 200. The data 200 includes accelerometer outputs 205, gyroscope outputs 210, touch screen outputs 215, camera outputs 220, microphone outputs 225, and notification data 295. The data 200 may be stored in a memory as will be described hereafter. The data 200 may be organized as register values, linked data structures, an array of pointers to data sources, a flat file, or combinations thereof.

The accelerometer outputs 205 may include sensor outputs 103 of the accelerometer 105 over a sampling time interval. The sampling time interval may begin before the initiation of the device notification 150. As a result, the accelerometer outputs 205, gyroscope outputs 210, touch screen outputs 215, camera outputs 220, and microphone outputs 225 may be received and stored before the initiation of the device notification 150.

The gyroscope outputs 210 may be digitized outputs of the gyroscope 110 over the sampling time interval. The gyroscope outputs 210 may indicate an orientation and/or an orientation change of the device 100.

The touch screen outputs 215 may store outputs from the touch screen 120 over the sampling time interval. The touch screen outputs 215 may be raw outputs from the touch screen 120. Alternatively, the touch screen outputs 215 may be a summary of pixel contact outputs from the touch screen 120. For example, the summary may be a total number of pixels contacted, an average pressure on the touch screen 120, or the like.

The camera outputs 220 may be raw outputs from the camera 115 over the sampling time interval. Alternatively, the camera outputs 220 may be processed outputs from the camera 115. The processed outputs may include an average illumination level, a processed image, or the like.

The microphone outputs 225 may be raw outputs from the microphone 145 over the sampling time interval. Alternatively, the microphone outputs 225 may be processed outputs from the microphone 145. For example, the processed microphone outputs 225 may be an average volume level, a frequency histogram, a voice print, or the like.

The notification data 295 may indicate a start time for the device notification 150. In addition, the notification data 295 may indicate a type of the device notification 150, such as an audible device notification 150 and/or a vibrational device notification 150. The notification data 295 may further indicate of volume of an audible device notification 150, an intensity of a device notification 150 such as a vibrational intensity, a visual intensity, a thermal intensity, a tactile intensity, or the like.

In one embodiment, the notification data 295 may be stored in a buffer and not overridden in response to receiving the device notification 150. For example, the notification data 295 may be stored in a protected buffer for retention time interval such as 10 seconds.

Figure 4A:
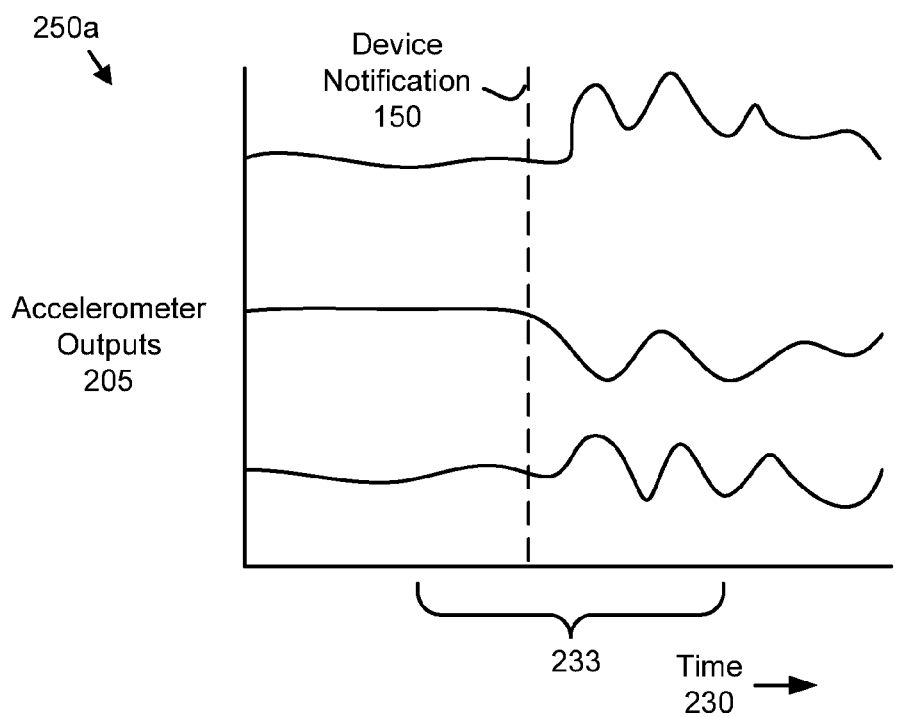
FIGS. 4A-H are schematic block diagrams and graphs illustrating embodiments of user awareness indications.

FIGS. 4A-H are graphs and schematic block diagrams illustrating embodiments of user awareness indications 250a-h. FIG. 4A depicts a graph showing detecting the user awareness indication 250a from the accelerometer outputs 205. The accelerometer outputs 205 from the accelerometer 105 are shown on the vertical axis. The horizontal axis is time 230.

The device notification 150 occurs at a specified time. Prior to the device notification 150, the accelerometer outputs 205 indicate a low level of acceleration by the electronic device 100. The low levels of acceleration may be because the electronic device 100 is disposed on a table, in a pocket, in a bag, in a case, or the like.

Subsequent to the device notification 150, the accelerometer outputs 205 indicate a higher level of acceleration by the electronic device 100. The increased levels of acceleration may be due to the user picking up the electronic device 100 and/or a bag or case containing the electronic device 100 in response to the device notification 150. The increased levels of acceleration may be interpreted as a user awareness indication 250a.

The sampling time interval 233 is also shown. In one embodiment, the accelerometer outputs 205 from the sampling time interval 233 may be stored in a buffer.

Figure 4B:
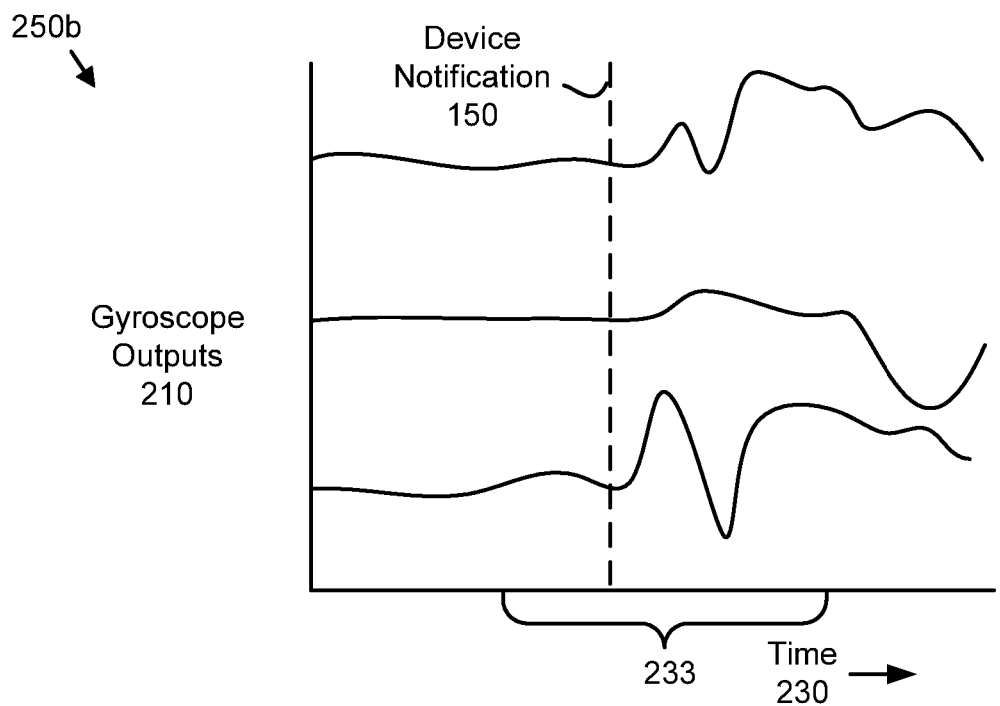

FIG. 4B depicts a graph showing detecting the user awareness indication 250b from the gyroscope outputs 210 of the gyroscope 110. The gyroscope outputs 210 are shown on the vertical axis while time 230 is the horizontal axis as in FIG. 4A.

The device notification 150 occurs. Prior to the device notification 150, the gyroscope outputs 210 indicate a low level of orientation change by the electronic device 100. The low levels of orientation change may be because the electronic device 100 is not in active use, but instead is disposed at a table, pocket, or the like.

Subsequent to the device notification 150, the levels of orientation change by the electronic device 150 increases. The increased levels of orientation change may be due to the user manipulating the electronic device 100 in response to the device notification 150. For example, the user may pick up the electronic device 100 from the table, remove the electronic device 100 from a pocket or case, or retrieve electronic device 100 from a bag. In addition, the user may tip the electronic device 100 in order to view the touch screen 120.

The increased levels of orientation change may be interpreted as the user awareness indication 250b. In one embodiment, gyroscope outputs 210 from the sampling time interval 233 may be stored to a buffer and analyzed to detect the user awareness indication 250b.

One of skill in the art will recognize that the user awareness indication 250b may also be detected from other changes in the gyroscope outputs 210, such as a change from high levels of orientation change to low levels orientation change, qualitative changes in the gyroscope outputs 210, and quantitative changes in the gyroscope outputs 210.

Figure 4C:
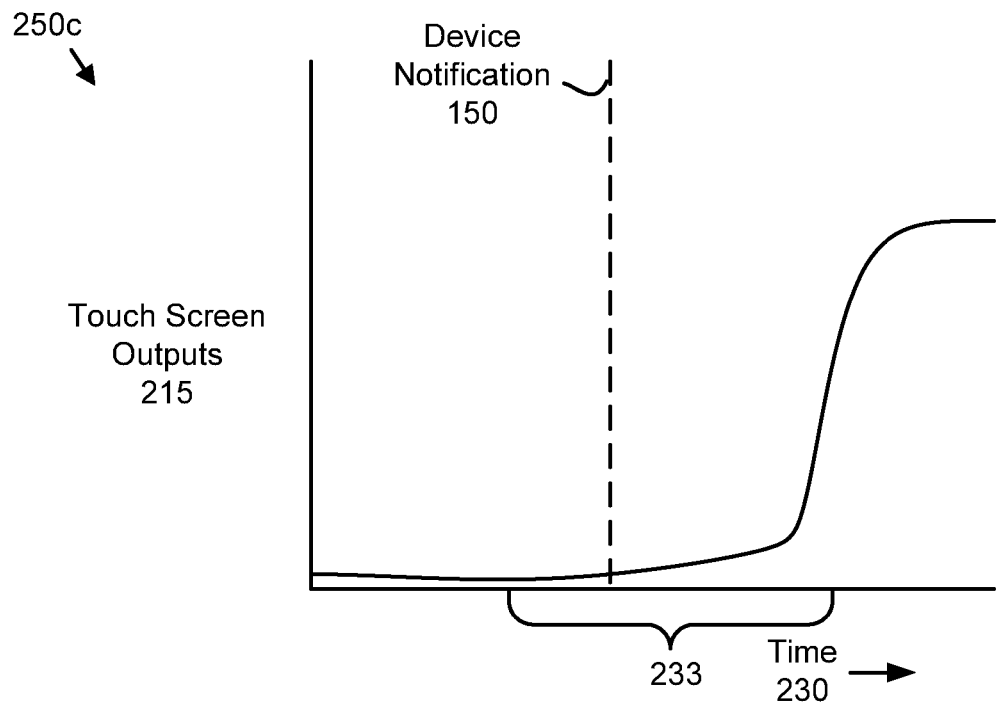

FIG. 4C depicts a graph showing detecting the user awareness indication 250c from touch screen outputs 215 of the touch screen 120. The touch screen outputs 215 are shown on the vertical axis, with time 230 on the horizontal axis. In one embodiment, the touch screen outputs 215 measures the total number of pixels on the touch screen 120 that are currently detecting a touch by an object.

As in FIGS. 4A-B, the device notification 150 occurs at a specified time. Prior to the device notification 150, the touch screen outputs 215 indicate a low level of interaction with the electronic device 100 by the user. For example, the touches detected by the touch screen 120 may be from fabric in a pocket. Subsequent to the device notification 150, the touch screen outputs 215 indicate a higher level of interaction with the electronic device 100 by the user. The increased levels of interaction may be due to the user picking up the electronic device 100 in response to the device notification 150.

The increased levels of interaction may be interpreted as a user awareness indication 250c. In one embodiment, the touch screen outputs 215 from the sampling time interval 233 may be stored to a buffer and analyzed to detect the user awareness indication 250c.

One of skill in the art will recognize that the user awareness indication 250c may also be detected from other changes in the touch screen outputs 215, such as a change from high levels of touch screen outputs 215 to low levels of touch screen outputs 215, qualitative changes in the touch screen outputs 215, and quantitative changes in the touch screen outputs 215.

Figure 4D:
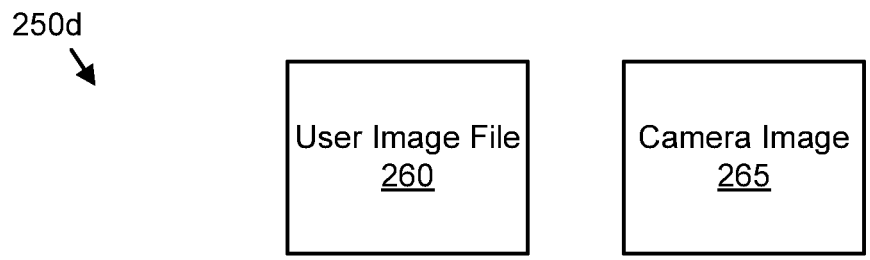

FIG. 4D shows a schematic block diagram of a user awareness indication 250d from a user image file 260 and a camera image 265. The camera image 265 may be captured from the camera outputs 220. The user image file 260 may have been previously stored on the electronic device 100. The user image file 260 may be an image of the user.

In one embodiment, the camera image 265 is compared to the user image file 260. A match between the camera image 265 and the user image file 260 may indicate that the user is looking at the electronic device 100 and can therefore be interpreted as a user awareness indication 250d.

Figure 4E:
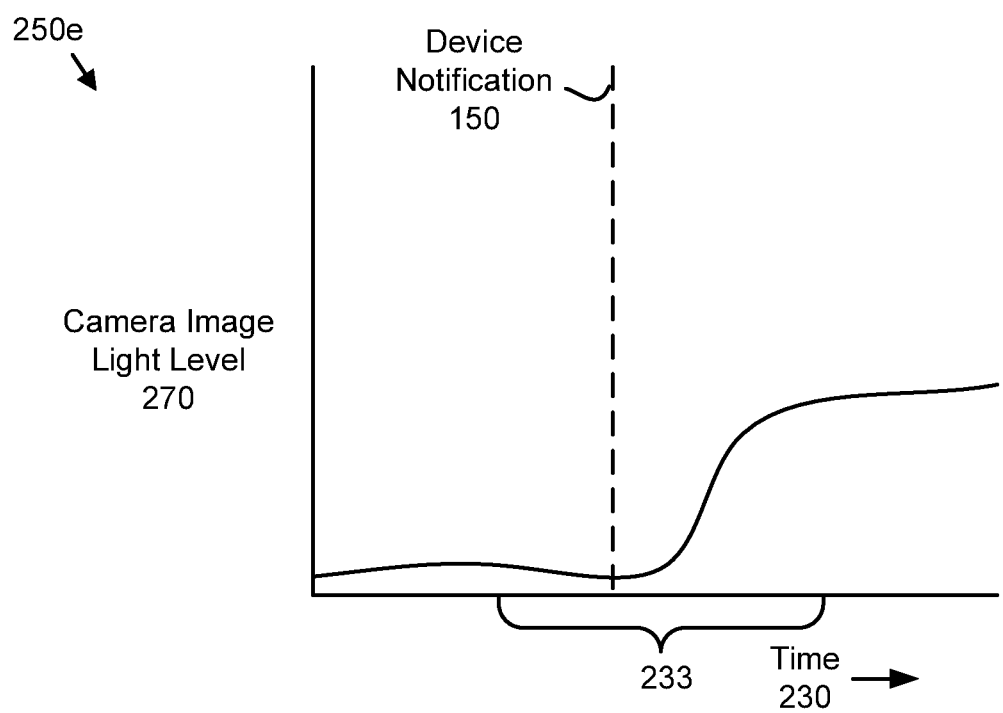

FIG. 4E depicts a graph showing detecting the user awareness indication 250e from a camera image light level 270. The camera image light level 270 may be calculated from the camera outputs 220. In one embodiment, the camera image light levels 270 is an average light level of the camera outputs 220. Alternatively, the camera image light level 270 may be the average light level for selected pixels of the camera 115. The camera image light level 270 may be indicative of ambient illumination for the device 100.

Prior to the device notification 150 the camera image light level 270 is a low. The low camera image light level 270 may be due to the electronic device 100 being disposed with the camera 115 against the table, or the electronic device 100 being disposed in a pocket, carrying case, or bag.

Subsequent to the device notification 150 the camera image light level 270 increases. The increased camera image light level 270 may be due to the user picking up the electronic device 100 from the table, or the user removing the electronic device 100 from a pocket, carrying case, bag, or the like.

The increased camera image light level 270 may be interpreted as the user awareness indication 250e. In one embodiment, the camera image light level 270 from the sampling time interval 233 is stored in a buffer and then analyzed to detect the user awareness indication 250e.

One of skill in the art will recognize that the user awareness indication 250e may also be detected from other changes in the camera image light level 270, such as a change from high camera image light levels 270 to low camera image light levels 270, qualitative changes in the camera image light levels 270, and quantitative changes in the camera image light level 270.

Figure 4F:
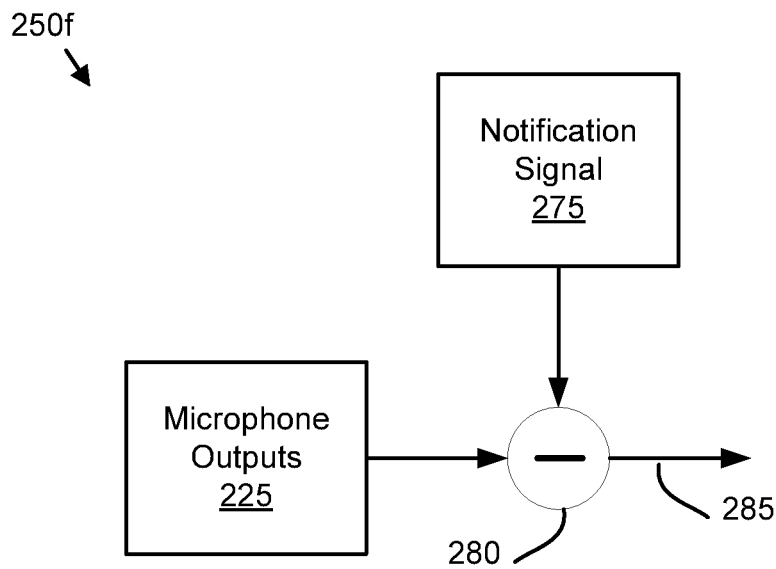

FIG. 4F is a schematic block diagram of generating a filtered microphone output 285 for detecting the user awareness indication 250f. A notification signal 275 is subtracted from the microphone outputs 225 from the microphone 145 by a difference device 280. The notification signal 275 may be an analog and/or digital audio signal of an audible device notification 150.

The difference device 280 generates the filtered microphone output 285 of the microphone outputs 225 with the notification signal 275 removed. The filtered microphone output 285 may be analyzed to detect the user awareness indication 255. One embodiment of an analysis of the filtered microphone output 285 is shown in FIG. 4G.

Figure 4G:
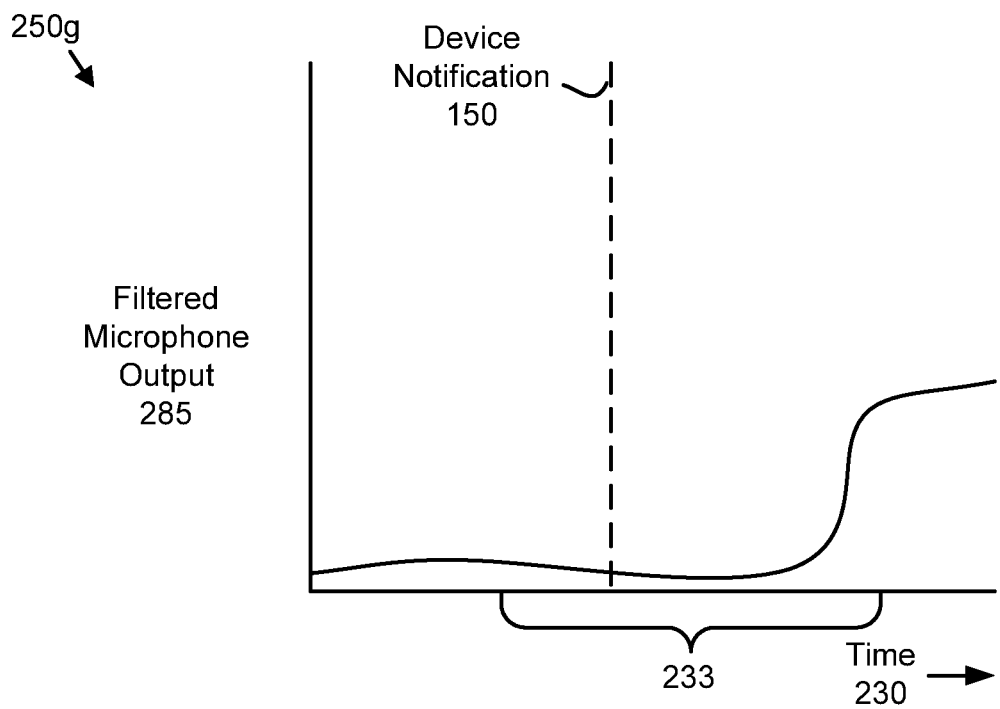

FIG. 4G depicts a graph showing detecting the user awareness indication 250g from the filtered microphone output 285. The filtered microphone output 285 of FIG. 4F is shown on the vertical axis and time 230 is shown on the horizontal axis. Prior to the device notification 150, the filtered microphone output 285 shows a low level of sound detected by the microphone 145. However, subsequent to the device notification, the level of the filtered microphone output 285 increases. In one embodiment, the increased level the filtered microphone output 285 is due to the user speaking to the electronic device 100 in order to provide the user awareness indication 250g. Alternatively, the increased level of the filtered microphone output 285 may be the result of the user removing the electronic device 100 from a pocket, carrying case, or bag, or otherwise manipulating electronic device 100.

The increased level of the filtered microphone output 285 may be interpreted as the user awareness indication 250g. In one embodiment, the filtered microphone output 285 from the sampling time interval 233 is stored in a buffer and then analyzed to detect the user awareness indication 256.

One of skill in the art will recognize that the user awareness indication 250g may also be detected from other changes in the filtered microphone output 285, such as a change from a high level of the filtered microphone output 285 to a low level of the filtered microphone output 285, qualitative changes to the filtered microphone output 285, and quantitative changes to the filtered microphone output 285. In one embodiment, the user awareness indication 250g may be detected by recognizing a spoken command.

Figure 4H:
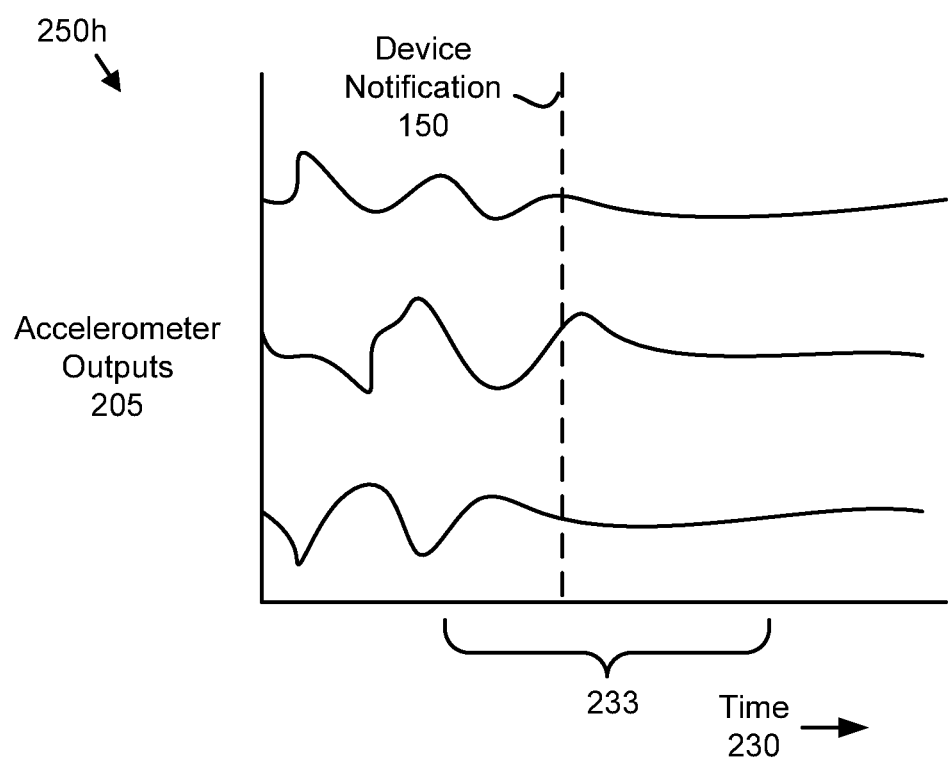

FIG. 4H depicts the graph of FIG. 4A. However, prior to the device notification 150, the accelerometer outputs 205 show higher levels of acceleration for the electronic device 100. Subsequent to the device notification 150, the accelerometer outputs 205 show lower levels of acceleration for the electronic device 100. For example, the user may be walking prior to the device notification 150, causing the higher levels of acceleration. Subsequent to the device notification 150, the user may stop to respond to the device notification 150. The lower levels of acceleration may be interpreted to indicate the user awareness indication 250h. Other data 200 may be similarly interpreted to detect the user awareness indication 250.

Figure 5:
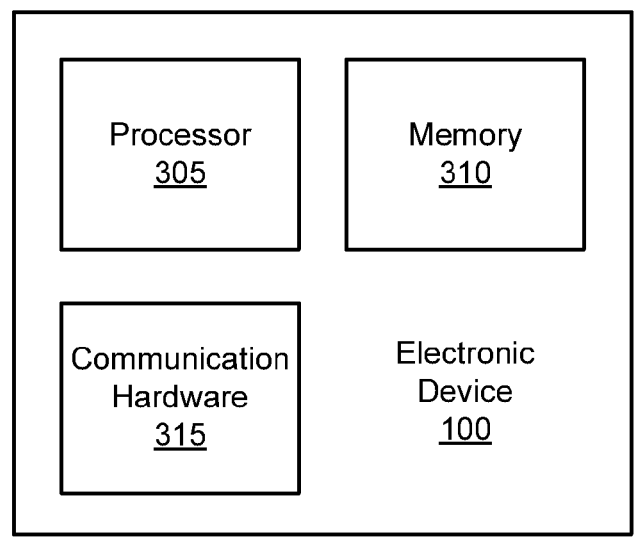
FIG. 5 is a schematic block diagram illustrating one embodiment of an electronic device.

FIG. 5 is a schematic block diagram illustrating one embodiment of an electronic device 100. The electronic device 100 includes a processor 305, a memory 310, and communication hardware 315. The memory 310 may be a semiconductor storage device, a hard disk drive, an optical storage device, a micromechanical storage device, or combinations thereof. The memory 310 may store computer readable code. The processor 305 may execute the computer readable code. The communication hardware 315 may communicate with other devices.

Figure 6:
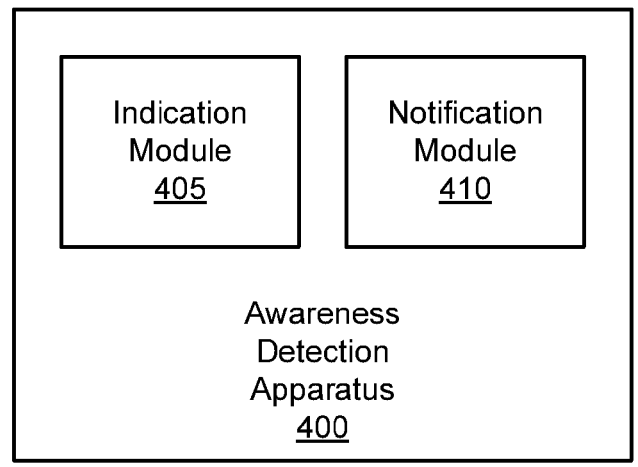
FIG. 6 is a schematic block diagram illustrating one embodiment of an awareness detection apparatus.

FIG. 6 is a schematic block diagram illustrating one embodiment of the awareness detection apparatus 400. The apparatus 400 includes an indication module 405 and a notification module 410. In one embodiment, the indication module 405 and the notification module 410 are embodied in the electronic device 100. In a certain embodiment, the indication module 405 and the notification module 410 are embodied in a computer readable storage medium such as the memory 310.

The indication module 405 detects the user awareness indication 250 of the device notification 150 for the device 100. The notification module 410 modifies the device notification 150 in response to detecting the user awareness indication 250. The notification module 410 may concurrently maintain a notification response option.

Figure 7:
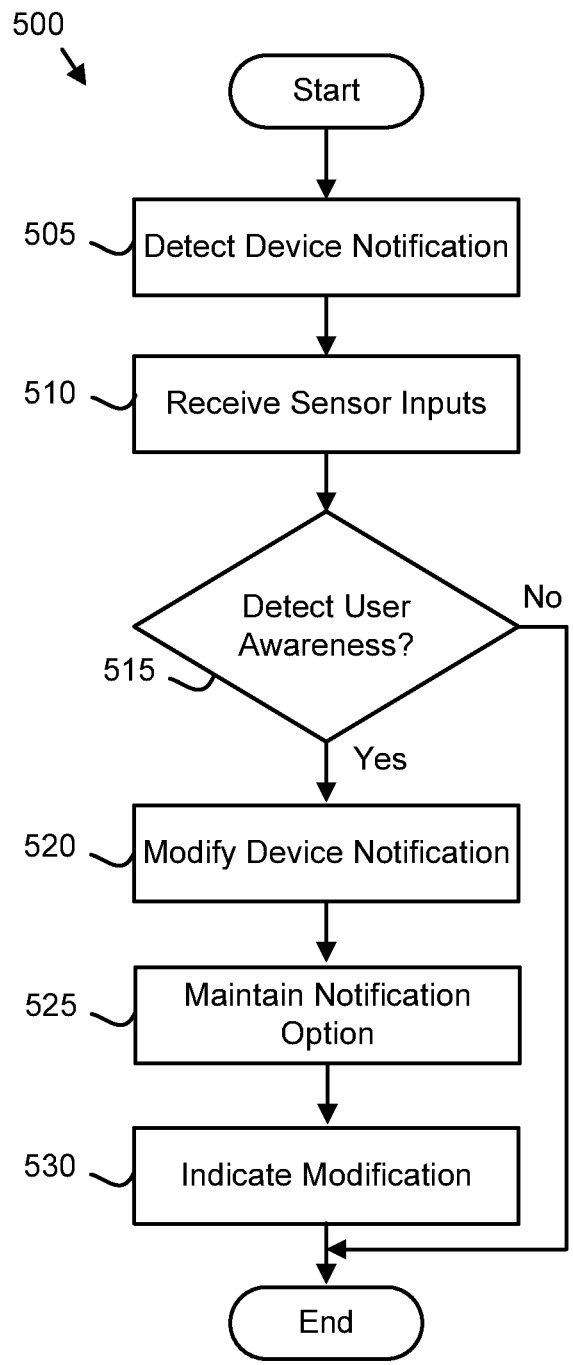
FIG. 7 is a schematic flow chart diagram illustrating one embodiment of a device notification modification method.

FIG. 7 is a schematic flow chart diagram illustrating one embodiment of a device notification modification method 500. The method 500 may perform the functions of the device 100 and apparatus 400. The method 500 may be performed by the processor 305. Alternatively, the method 500 may be performed by a program product comprising a computer readable storage medium such as the memory 310 storing computer readable code that is executable by the processor 305.

The method 500 starts, and in one embodiment the indication module 405 detects 505 the device notification 150. In one embodiment, the notification controls 130 communicate information regarding the device notification 150 to the indication module 405. In one embodiment, the indication module 405 monitors the notification controls 130. Alternatively, the indication module 405 may receive an interrupt call from an interrupt triggered by the device notification 150. The indication module 405 may store the information regarding the device notification 150 as the notification data 295.

The indication module 405 may further receive 510 sensor outputs 103. The sensor outputs 103 may include but are not limited to the accelerometer outputs 205, the gyroscope outputs 210, the touch screen outputs 215, the camera outputs 220, and the microphone outputs 225. In one embodiment, the sensor outputs 103 from the sampling time interval 233 are received 510 and stored to a buffer in the memory 310.

The indication module 405 may further detect 515 the user awareness indication 250 of the device notification 150 for the device 100. In one embodiment, the user awareness indication is detected 515 from a change in acceleration of the device 100. For example, the indication module 405 may detect 515 the change in the accelerometer outputs 205. The change in accelerometer outputs 205 may be similar to those illustrated in FIGS. 4A and 4H.

Alternatively, the user awareness indication 250 may be detected 515 from a change in ambient illumination for the device 100. For example, the indication module 405 may detect 515 a change in the ambient illumination from a change in the camera image light level 270.

In one embodiment, the user awareness indication 250 is detected from identifying the user looking at the device 100. The user may be identified looking at the device 100 by capturing a camera image 265 from the camera 115 and comparing the camera image 265 to the user image file 260. The user awareness indication 250 may be detected if the camera image 265 is matched to the user image file 260.

The user awareness indication 250 may be detected 515 from a touch to the device 100. In one embodiment, the touch may be detected from the touch screen outputs 215. The user awareness indication 250 may be detected 515 from a number of the touch screen outputs 215 exceeding a touch threshold, an increase in the touch screen outputs 215, a decrease in the touch screen outputs 215, or combinations thereof.

If the user awareness indication 250 is not detected 515, the method 500 ends. If the user awareness indication 250 is detected 515, the notification module 410 may modify 520 the device notification 150 in response to detecting the user awareness indication 250. In one embodiment, the notification module 410 modifies 520 the device notification 150 by terminating the device notification 150. For example, if the device 100 is a mobile phone and the device notification 150 is a ring, the ring may be terminated. Alternatively, if the device notification 150 is a vibration, the vibration may be terminated.

The notification module 410 may modify 520 the device notification 150 by terminating an audio portion of the device notification 150. For example, the notification module 410 may instruct the notification controls 130 to terminate sending an audible device notification 150 through the speakers 140. However, the notification controls 130 may continue to vibrate the device 100 using the vibration device 135.

The notification module 410 may concurrently maintain 525 the notification response option. In one embodiment, the notification response option is an option to respond to an incoming call. Alternatively, the notification response option may be an option to respond to an alarm, respond to a text, respond to an email, respond to a notification, or combinations thereof.

The notification module 410 may further indicate 530 the modification to the device notification 150 and the method 500 ends. In one embodiment, the notification module 410 indicates 530 the modification through an audible modification indication such as a chirp, tone, or the like generated by the speaker 140. Alternatively, the notification module 410 may vibrate the device 100 to indicate 530 the modification. In one embodiment, a visual icon on the touch screen 120 may indicate the modification. The visual icon may be a message, a button, or the like.

By detecting the user awareness indication 250 of the device notification 150 and modifying the device notification 150, the annoyance of the device notification 150 is reduced or eliminated when the device notification 150 has successfully notified the user. Thus the device notification 150 stops notifying when its task is complete.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor;
a memory storing code executable by the processor to:
detect a user awareness indication of a device notification for a device, the user awareness indication comprising identifying a user looking at the device and an increase in a filtered microphone output for the device within a sampling time interval, wherein the device notification occurs within the sampling time interval, a start of the sampling time interval precedes the device notification, and the filtered microphone output is filtered with a difference of a notification signal of the device notification; and
terminate an audio portion of the device notification in response to detecting the user awareness indication and concurrently maintaining a notification response option.

2. The apparatus of claim 1, wherein the user awareness indication further comprises a change in an acceleration of the device.

3. The apparatus of claim 1, wherein the user awareness indication further comprises a touch to the device.

4. The apparatus of claim 1, wherein the user awareness indication further comprises an increase in external illumination for the device with the sampling time interval.

5. A method comprising:
detecting, by use of a processor, a user awareness indication of a device notification for a device, the user awareness indication comprising identifying a user looking at the device and an increase in a filtered microphone output for the device within a sampling time interval, wherein the device notification occurs within the sampling time interval, a start of the sampling time interval precedes the device notification, and the filtered microphone output is filtered with a difference of a notification signal of the device notification; and
terminating an audio portion of the device notification in response to detecting the user awareness indication and concurrently maintaining a notification response option.

6. The method of claim 5, wherein the notification response option comprises an option to respond to an incoming call.

7. The method of claim 5, wherein the user awareness indication further comprises a change in an acceleration of the device.

8. The method of claim 5, wherein the user awareness indication further comprises a touch to the device.

9. The method of claim 5, wherein the user awareness indication further comprises an increase in external illumination for the device with the sampling time interval.

10. The method of claim 5, the method further comprising:
detecting the device notification; and
receiving sensor outputs.

11. The method of claim 10, wherein the sensor outputs are one or more of accelerometer outputs, gyroscope outputs, touch screen outputs, camera outputs, and microphone outputs.

12. A program product comprising a non-transitory computer readable storage medium storing computer readable code executable by a processor to perform:
detecting a user awareness indication of a device notification for a device, the user awareness indication comprising identifying a user looking at the device and an increase in a filtered microphone output for the device within a sampling time interval, wherein the device notification occurs within the sampling time interval, a start of the sampling time interval precedes the device notification, and the filtered microphone output is filtered with a difference of a notification signal of the device notification; and
terminating an audio portion of the device notification in response to detecting the user awareness indication and concurrently maintaining a notification response option.

13. The program product of claim 12, wherein the user awareness indication further comprises one or more of a change in an acceleration of the device, and a touch to the device.

14. The program product of claim 12, wherein the user awareness indication further comprises an increase in external illumination for the device with the sampling time interval.

* * * * *